United States Patent Office 3,125,489
Patented Mar. 17, 1964

3,125,489
SUCKLING RODENT AND CHICK EMBRYO ATTENUATED MEF-1 POLIO VIRUS AND THE PRODUCTION THEREOF
Victor J. Cabasso, Pearl River, and Herald R. Cox, Suffern, N.Y., Arden W. Moyer, Park Ridge, N.J., and Manuel Roca-Garcia, Suffern, N.Y., assignors to American Cyanamid Company, New York, N.Y., a corporation of Maine
No Drawing. Filed Dec. 26, 1958, Ser. No. 783,007
4 Claims. (Cl. 167—78)

This invention relates to a modification and attenuation of the Lansing type poliomyelitis virus and modified viruses avirulent to man and capable of inducing antibodies in human being against the Lansing type of poliomyelitis virus.

Poliomyelitis is a neurotropic virus disease of human beings that in some cases produces paralysis and death. The virus exists in three immunologically distinct types referred to as Brunhilde, Lansing and Leon, respectively. It is with the second or Lansing type of virus that the present invention deals.

Protection against poliomyelitis by vaccination, that is to say by the artificial introduction of a virus into the human body, may be effected by the use of virus in a form that is capable of stimulating the formation of protective substances, termed antibodies. These antibodies in common with other antiviral antibodies are type-specific and protect only against the type of virus which evoked them. For example, protection against poliomyelitis caused by the Lansing type virus is afforded by antibodies stimulated by a Lansing type virus but not by antibodies stimulated by a Brunhilde or a Leon type of virus.

The form of the vaccine used to stimulate antibody production may be either (1) a killed virus preparation in which the disease producing virus has been rendered harmless by inactivation with a chemical such as formalin or a physical agency such as ultraviolet light, or (2) a living virus but one incapable of provoking clinical disease obtained by selectively modifying or attenuating the virus by means of prolonged cultivation of it in a suitable non-human host or hosts according to the present invention. The strain of virus developed by this method is capable of growth and multiplication in vaccinated persons without causing overt disease and it is capable of stimulating the formation of protective antibodies against the Lansing type of poliomyelitis virus in such vaccinated individuals.

Subsequent to the filing of the parent application, Serial No. 311,328, filed September 24, 1952, of which the present application is in part a continuation, a great deal of practical success has been achieved in the United States with a killed virus polio vaccine, in this case a mixed vaccine of killed viruses representing all three types. This is the famous Salk vaccine which is now used in enormous quantities in the United States. Dr. Salk's contributions constitute a milestone in the advance of protection against poliomyelitis. However, the killed virus vaccines prepared from viruses which are fully capable of inducing polio are not free from certain disadvantages.

In the first place, its production is slow, expensive and involves critical control to detect even the merest trace of residual live virus. If the treatment with formaldehyde is insufficient, some live virulent virus remains as was shown by the tragic results of an incompletely killed batch of virus vaccine in the first year of the Salk tests. On the other hand, if the treatment is too drastic, the resulting product may be perfectly safe but too far altered to stimulate antibody production in human beings.

A second disadvantage is that the vaccine must be applied by injection. This means added cost and, of course, the added discomfort to the person inoculated.

A third disadvantage is that the effectiveness of the killed virus vaccine is dependent upon repeated injections. Even after two successive injections, published figures using Salk vaccine show that after first injection, there was substantially no development of antibodies in susceptible children. Even after two injections, more than a third remained without antibodies. It is only after three or more injections that there is a reasonable percentage of effectiveness in immunizing children who were previously without antibodies. This disadvantage is much more serious than the mere multiplication of cost and discomfort. Until circulating antibodies have been produced to confer immunity, a vaccinated person is vulnerable and so it takes a long time, many months, before effective immunity is produced in many individuals. In the meantime, the possibility of a paralytic attack of poliomyelitis exists.

It is to avoid these disadvantages, and a possible disadvantage on duration of immunity which will be described below, that there is need for a good, safe and effective attenuated live virus vaccine which can be administered orally in liquid form and which is compatible with vaccines prepared from other types of poliomyelitis virus. This purpose is completely and satisfactorily solved by the present invention with respect to Lansing type of poliomyelitis virus. Since the filing date of the parent application, there have also been developed equally safe and effective attenuated or modified live virus vaccines for Brunhilde and Leon types of polio virus. The Lansing live virus vaccine produced by the present invention is completely compatible with the other two and can be given as part of a combined triple type vaccine without adversely affecting the antigenicity of the other type vaccines or itself being adversely affected. This is an unexpected and important property. As late as December of 1956, Dr. Sabin, in his famous studies reported in Journal of the American Medical Association, volume 162, pages 1589 to 1596, believed that there was serious interference, at least with respect to the Leon type vaccine. On page 1591 he states that there was complete suppression of activity of Leon type vaccine and while in one human being there was no suppression, he warns against the use of composite live virus vaccines for oral use.

The fact that following the present invention, an orally administerable live virus vaccine for the Lansing type can be produced and can be administered orally together with live virus vaccines for the other two virus types is of great practical value and is completely unexpected. Oral vaccines containing attenuated live viruses of all three types have been fed to more than 200,000 minors and a large number of adults without producing any case of clinical poliomyelitis and with a production of antibodies in more than half, and usually in much more than half, of the susceptible minors, in some tests more than 85%. It is also remarkable that an increase in antibody titer was observed in a majority of all those vaccinated, including many who had a high antibody titer at the time of vaccination.

Throughout the specification and claims the term "avirulent" will be used to cover virus products which, while still infectious, do not produce in primates clinical poliomyelitis symptoms, onset of paralysis. The term will be used in the above sense only.

In order to deal with measurable quantities and to define the present invention in quantitative form, it is not practical to deal in terms of susceptibility and immunity. In the population as a whole, only one person in a thousand who has a poliomyelitis virus infetcion develops paralytic polio, sometimes referred to as clinical symptoms. Thus, if one is to deal with immunity on a quantitative basis, it is difficult to get exact figures, even when statistically large numbers of persons are concerned. However, there is a factor, presence of antibodies, which is well correlated with immunity and which can be quantitatively determined. It has been well known for decades, that immunity to virus diseases correlates well with the presence of specific antibodies in the serum of the individual. This is an axiom of immunology and it is true also of poliomyelitis infection. See, for example, the classical study of Dr. Bodian, American Journal of Hygiene, volume 56, No. 1, July 1952, pages 78 to 89. One page 86, Dr. Bodian states that there is a good correlation between antibody presence and immunity. Dr. Bodian concludes with the statement: ". . . that the level of serum antibody can be used as a quantitative index of immunity." Therefore, in defining and characterizing the present invention, ability to induce antibody formation will be used.

The presence or absence of type-specific poliomyelitis antibody in blood serum may be determined indirectly by the method of complement-fixation or by means of the virus neutralization test which provides a direct measure of the amount of antibody present. The end point in the serum neutralization test is the least amount or the highest dilution of serum that will suppress the activity of a standard dose of live virus either in a tissue culture system or in intact susceptible animals. Ordinarily the lowest dilution of serum listed is 1:4. The donors whose sero fail to demonstrate protective action at the 1:4 dilution are called sero-negative and donors whose sero do protect at 1:4 or higher dilutions are called sero-positive. Persons who were sero-negative at the time of vaccination but whose serum protects at the 1:4 dilution after vaccination are regarded as having shown a four-fold rise in antibody concentration. Individuals who were already sero-positive at the time of vaccination, for example whose sera were positive at the 1:4 dilution but negative at the 1:8 dilution, must show at least a four-fold increase in antibody concentration, in this instance the serum must show protective properties in a 1:16 dilution or greater, to be regarded as having given a significant response to vaccination. The four-fold or greater increase in antibody concentration is a generally accepted criterion of significant response. The terms and interpretations as set forth in this paragraph will be used in the sense herein given and in no other throughout the specification and claims.

In the hundreds of thousands of oral vaccinations with vaccines produced by using the present invention, more than half of the sero-negative individuals became sero-positive, usually more than 80%. Taking everyone vaccinated, both sero-negatives and those having various amounts of antibodies at the time of vaccination, a significant increase in antibodies was shown in a majority of the cases.

The most important result of a vaccination is to change sero-negative persons, particularly children, into sero-positives, because this is the difference between susceptibility and immunity, between paralytic polio and uneventful exposure to infection. It should be realized that ordinarily 100% vaccination response will not be encountered. There are a few unfortunate persons who are incapable of developing antibodies and this is true in the case of poliomyelitis too. However, the efficacy of a vaccine can be measured by the percentage of those vaccinated who change from the sero-negative to the sero-positive state. In this respect, all attenuated live virus vaccines produced according to the present invention are extraordinarily effective and the desired result is obtained quickly. A single vaccination is effective in a majority of the cases as against little or no effect after one injection with a killed virus vaccine. This rapid response is an advantage of the product of the present invention.

Essentially, the present invention involves serial virus passages through non-human hosts under conditions which (1) favor a survival of modified and avirulent virus particles or mutants and (2) suppress or reduce the survival of those virulent for the human species. This may be considered as a successive screening operation. Such an operation can, of course, be done manually, that is to say randomly a number of virus strains or colonies can be tested for virulence, the least virulent segregated and repropagated and the isolates again tested, employing for the next passage only those which show low virulence, until finally the virulent virus individuals are eliminated and the avirulent strain breeds true. The vaccine may then be produced from such a strain for it can be indefinitely propagated by growth in standard media, such as monkey kidney cells. When the screening is done by deliberate and planned human manipulation and selection, it makes no difference what the growth medium is so long as the successive colonies of virus will still grow. This procedure is capable of producing a true breeding, avirulent live virus which is the object of the present invention to produce and such a product as a vaccine is useful. However, the cost of the successive screening in the absence of fantastic luck is staggering and can amount to a great number of man years of labor. Accordingly, the preferred process of the present invention involves the serial passages, in non-primate hosts, which automatically perform the screening operation. That is to say, these non-primate hosts constitute an environment which automatically and without human selection decreases the survival of the virulent virus and favors the survival of an avirulent strain. Such a process is enormously cheaper than the manual screening and constitutes the preferred process aspect of the present invention.

While the above concept sounds simple and even obvious, this is not the case in practice. If one attempts to use poliomyelitis susceptible primate tissues as hosts, such as monkey kidney cells, no differential environment is set up. The virus continues as it is and both the virulent and the avirulent virus particles can grow equally well. Primate tissue is therefore ruled out, for it is inoperative as a selective medium. A good many years ago, an attempt was made to grow polio virus serially in adult cotton rats and then in adult mice. The result was a complete failure as far as producing a virus avirulent to primates is concerned.

When an attempt is made to introduce unmodified live virulent virus into chick embryos, a very convenient and common form of medium for virus work, the virus does not grow. Up to the time of the present invention, therefore, polio virus was not grown in a host in which a differential survival condition was present to produce a virus avirulent to primates.

According to the present invention, it has been found that there is a non-primate host in which polio virus can be grown under conditions producing a differential survival of virulent and avirulent individual virus particles. This is the central nervous tissue of suckling rodents. It is possible to use suckling mice but for convenience, suckling hamsters are preferable. Serial passages through the central nervous tissue of the suckling rodents produces a profound modification or attenuation of the polio virus and if the number of passages is sufficiently great, for example at least thirty serial passages, the virus becomes avirulent to primates, including man, and will produce antibodies. In other words, this procedure will produce a modified or attenuated Lansing type live virus vaccine which is covered by the product aspect of the present invention and is so included broadly. However, in a more specific aspect of the present invention, both from the standpoint of product and process, a different procedure is followed. As a process, therefore, and as a specific product, the Lansing type virus modified and attenuated by serial passages through suckling rodent central nervous tissue is not claimed in the present invention as it forms the subject matter of the copending application of Cox and Moyer, Serial No. 783,008, filed December 26, 1958, now abandoned, which in turn is in part a continuation of a copending application, Serial No. 311,327, filed September 24, 1952, and now abandoned.

In the more specific aspects of the present invention and in its only process aspect, a different procedure is involved. Intra-cerebral passage through suckling rodents is a slow and costly procedure and so the process aspect of the present invention is based on a surprising observation that after a sufficient number of passages through the suckling rodents, the virus becomes modified so that it will grow in chick embryos. Then serial passages through the chick embryos, a much cheaper procedure, permits attenuating the virus until the desired degree of avirulence to humans results and the virus no longer produces paralytic polio in experimental primate animals. A great reduction in cost of producing the vaccine over a comparable all suckling rodent brain tissue passage is thus achieved. The cost of the process is reduced and in a more specific aspect, this preferred process and the product of this preferred process are included within the scope of the present invention.

It should be understood that it is essential, both for the broad and specific aspects of the present invention, as far as product is concerned, that the original virus be modified by serial passage through non-human hosts under conditions which reduce survival of virulent virus particles as compared to avirulent. Once the virus has been obtained in its final avirulent form, it will breed true and so the conventional means of continued growth and harvest of the once prepared virus such as the conventional monkey tissue route can be employed. The virus is not thereby changed but retains the characteristics of the present invention, namely compatibility with live virus vaccines of Brunhilde and Leon types and the ability to change sero-negative children to sero-positives in a majority of cases following a single application.

The invention will be described more particularly in detail in conjunction with a specific and practical example.

Poliomyelitis virus strain, Lansing type, in the form of an aqueous suspension of ground nervous tissue carrying the seed virus, is inoculated intracerebrally into suckling rodents, preferably hamsters, of from about 1 to 12 days of age. The use of other suckling rodents of other age levels for use in the building up of the $LD_{50}$ mouse titer of the virus and in adapting it to grow in embryonic egg tissue is not precluded. This virus is allowed to grow in the suckling rodents until evidence of illness is observed in at least some of the animals that have been inoculated. This time, which will be of the order of 48 hours at the beginning of the serial passages, is later reduced to about 18 to 24 hours as the virus is modified in the suckling rodent passages. When evidence of illness is exhibited by some of the inoculated sucklings, the whole lot is sacrified and their central nervous tissue removed and made into a suspension, usually isotonic saline, and further inoculation continued in the manner described.

An important part of the invention in addition to that of using suckling rodents is to harvest the infected tissue at a time just prior to that at which they commence to show evidence of paralysis. We have observed that there is a greater concentration of live virus particles in the nervous tissue at a time prior to visible evidence of paralysis. Therefore, by sacrificing the suckling rodents just before they display the symptoms, it is possible to obtain a larger concentration of virus particles from their nervous tissue. A convenient way of establishing the time for harvesting the central nervous tissue is to inoculate a number of suckling rodents at the same time and harvest the infected nervous tissue from the whole group when the first ones show clinical evidence of illness. In this way, the majority of the remaining rodents will be sacrificed and their nervous tissue removed at a time at which the titer of the virus is at a near maximum.

The process of inoculating suckling rodents, preparing a suspension of their nervous tissue and inoculating non-immune sucklings continues serially in the manner described with constant observation being made of the $LD_{50}$ mouse titer of the resulting suspension. It is found that as a result of this method of propagating virus, the $LD_{50}$ mouse titer of the preparation shows a persistent tendency to increase to levels of as high as $10^{-5}$ and even as high as $10^{-7.5}$ with continued serial passages.

When the $LD_{50}$ mouse titer of the suspension as prepared from the central nervous tissue has reached a value of at least $10^{-5}$, the virus may then be transferred to incubating eggs in the manner described hereinafter and then passed serially in the chick embryo until the virus has been modified so that it may be safely used as a live vaccine for the prevention of poliomyelitis in humans and other primates.

To illustrate these processes in greater detail, a specific series of such passages will be described. It will be understood that the invention is not restricted to the particular conditions that prevailed in this series. Obviously, the invention is of a broader nature and is to be restricted only by the basic principles set forth and claimed herein.

The central nervous tissue from Syrian (golden) hamsters 6 to 8 weeks of age which had been inoculated with the MEF–1 strain of the Lansing type poliomyelitis virus was removed and ground into a suspension with Ringer's solution. The $LD_{50}$ titer in mice of the suspension was about $10^{-2.6}$. The suspension was centrifuged for 30 minutes in an International No. 1 centrifuge at about 2500 r.p.m. and the supernatant liquid was then used to inject suckling hamsters as described below.

A quantity of 0.03 ml. of the above described 10% suspension was injected intracerebrally into each of 20 suckling, unweaned Syrian hamsters 10 days of age. About 48 hours later, two of the animals showed signs of illness, and on the third day two more animals were similarly sick. On the day symptoms were first noted, the affected animals were killed and their brains and spinal cords removed and made into a 10% suspension as decribed above. The suspension was frozen and stored at −15° C. until tested for bacterial sterility at which time it was ready for further use. Following the sterility test, the frozen suspension was thawed and 0.03 ml. was injected into the brains of other suckling unweaned hamsters ranging from 1 to 12 days of age. The harvesting procedure was repeated as described above and inoculation of other suckling hamsters continued in serial passage. In some instances, isotonic saline was used to prepare the virus suspension instead of Ringer's solution. At other times only the lower brains and spinal cords of the infected suckling hamsters were harvested. As the serial passages continued, it was found that the length of time between the intracerebral injection and the first symptoms of sickness became progressively shorter so that after a number of serial passages the harvesting of the central nervous system tissue was made at approximately 18 to 24 hours after the inoculation as compared with 2 to 3 days at the beginning of the series.

During the serial passage, the $LD_{50}$ titer of the tissue suspension was constantly determined. Surprisingly, it was found that the $LD_{50}$ titer showed definite increases. This may be illustrated by the following table:

| Hamster Passage | $LD_{50}$ titer | Hamster Passage | $LD_{50}$ titer | Hamster Passage | $LD_{50}$ titer |
| --- | --- | --- | --- | --- | --- |
| 1° [1] | $10^{-2.65}$ | 45 | $10^{-5.50}$ | 90 | $10^{-5.60}$ |
| 5 | $10^{-2.60}$ | 50 | $10^{-5.20}$ | 100 | $10^{-6.00}$ |
| 10 | $10^{-2.75}$ | 55 | $10^{-5.50}$ | 105 | $10^{-6.25}$ |
| 15 | $10^{-4.00}$ | 60 | $10^{-4.50}$ | 110 | $10^{-7.00}$ |
| 20 | $10^{-4.10}$ | 65 | $10^{-5.25}$ | 115 | $10^{-6.35}$ |
| 25 | $10^{-4.75}$ | 70 | $10^{-5.25}$ | 120 | $10^{-7.25}$ |
| 30 | $10^{-5.70}$ | 75 | $10^{-5.80}$ | 125 | $10^{-6.05}$ |
| 35 | $10^{-5.50}$ | 80 | $10^{-6.00}$ | 130 | $10^{-7.50}$ |
| 40 | $10^{-5.25}$ | 85 | $10^{-6.70}$ | | |

[1] First passage in 7 to 10 day old hamsters was the result of inoculation of the animals with material representing the 32nd serial passages in 6 to 8 week old hamsters.

It will be seen from the above that as a result of the procedure of inoculating suckling, unweaned hamsters and harvesting their central nervous tissue at the time the first one or two animals showed signs of illness, it has been possible to develop a poliomyelitis virus strain having an $LD_{50}$ titer for mice greatly in excess of any value reported heretofore.

Proof that the virus retained the characteristic features of the Lansing strain poliomyelitis virus was obtained by standard neutralization tests employing known type specific antisera.

Tests with mice at the 119th young hamster passage level indicated that the virus had an $LD_{50}$ titer of about $10^{-6.5}$. A 10% suspension of spinal cord from paralyzed mice which had been inoculated with the 119th hamster passaged material was prepared and 0.6 ml. of it was inoculated in the yolk sac of 7 day old chick embryos. On the 4th day after inoculation, the embryos were harvested and a suspension containing about 75% embryo was prepared and again tested in mice by intracerebral injection. The $LD_{50}$ titer of the chick embryo suspension prepared was found to be somewhat lower, about $10^{-2.5}$. However, all of the inoculated animals became paralyzed four to six days after inoculation at which time they were sacrificed and a 10% suspension of their spinal cord tissue was prepared and 0.6 ml. portions were injected into the yolk sac of 7 day old chick embryos as before. The embryos were again harvested and made into a suspension and tested in mice. The $LD_{50}$ titer remained approximately constant. Suspensions of the nervous tissue of the mice were prepared and inoculated into the yolk sac of incubating eggs. On the 7th day after inoculation, the embryos were harvested and a suspension made from the pooled material and inoculated into the yolk sac of incubating chick embryos as before.

The inoculation of the chick embryos continued serially with occasional checking of the $LD_{50}$ titer in mice. As the serial passages in eggs continued, it was found that the virus retained its pathogenicity for mice but when injected intracerebrally in monkeys it was less virulent than the parent strain, thus showing the successful propagation of the virus in chick embryo tissue and a reduction in the virulence of the virus with continued serial passages through chick embryos. The passages are continued until the virus is avirulent to primates in the above test.

In another series of chick embryo passages, 7 day old chick embryos were inoculated in the allantoic cavity with 0.25 ml. of a 20% suspension of the infected central nervous tissue harvested from suckling hamsters at the 131st passage level as described above. These eggs were incubated at 37° C. for 7 days after which the embryos and membranes were harvested aseptically, pooled, ground in a Waring Blendor and centrifuged at 2000 r.p.m. for 20 minutes in an anglehead centrifuge.

A suspension of 20% of the ground tissue from the first egg passage was prepared and inoculated into the allantoic cavity of 7 day old chick embryos and the incubation continued at 37° C. for 7 days. Ten successive egg passages were thus made using 7 day old embryos and a 7 day incubation period at 37° C.

While these egg passages were continuing, titrations of the suspension prepared from the infected embryonic tissue were made in mice. It was found that the virus propagated in the incubating eggs. Collaterally, it was found that a 4 to 5 day incubation period at 37° C. after inoculation with the viral suspension yielded a higher mouse $LD_{50}$ titer in the embryonic tissue than was obtained during the 7 day incubation period. Accordingly, the shorter incubation periods were used in succeeding egg passages. As the serial passages in the embryonic tissue continued, it was observed that the $LD_{50}$ mouse titer shower a distinct tendency to increase.

Proof of the identity of the egg propagated agent with the Lansing type poliomyelitis virus was obtained by the neutralization test in mice performed at several egg passage levels with immune monkey serum of known type from different sources. Cross neutralization studies in mice showed that antibodies stimulated in monkeys by the Brunhilde and Leon type poliomyelitis virus neutralized the egg propagated Lansing type virus to an extent suggesting some serological relationship to the parent strain obtained by the serial egg passages. Other tests relating to the virulence of the virus for primates showed that it was being modified by the serial passages in egg embryonic tissue to the point that it could be used as a live virus vaccine, preferably for administration by the oral route.

The advantages of propagating poliomyelitis virus in the chick embryo is obvious to those skilled in the art. When preparing live virus vaccines from the central nervous tissue of animals, there is the ever present danger that the animal may be infected with some other neurotropic disease and the patient be thus inoculated with some pathogen which might cause illness or even death. Unfortunately, it is not always possible to detect these contaminations until after the damage has been done and accidents of this type as well as allergic encephalitis attacks have occurred when using vaccines prepared from the central nervous tissue of animals. When using chick embryos, the culture medium is free from agents potentially pathogenic for man and there is little chance of a contaminating organism being harvested along with the chick embryo tissue from which the live virus vaccine is prepared. Furthermore, being an unnatural host for most viral agents, chick embryonic tissue serves remarkably well in bringing about the modification of the virus to the desired point of safety. In addition, fertile eggs are in unlimited supply and can be procured readily at all times of the year and are relatively inexpensive when compared with animals. Although eggs of various birds could be used, those of the chicken are preferred because of their low cost and fairly constant availability. For these and other reasons, it is considered a major advance in the art to propagate poliomyelitis virus in chick embryo tissue.

Various methods of growing the poliomyelitis virus in chick embryos may be followed. The route of inoculation may be in the chorio-allantoic membrane, the allantoic sac, the yolk sac or elsewhere. The incubation period may vary from 2 to 10 days or more with, of course, due regard to the most efficient production of viral bodies as determined by titration tests in mice. As noted above, we prefer a 2 to 7 day incubation period following the inoculation. The age of the embryo at inoculation may likewise vary widely ranging from about 1 to 12 days. The volume of the inoculum may also vary considerably but will generally be of the order of 0.05 to 0.8 ml., preferably about 0.2 to 0.5 ml. The harvested material containing the desired virus may consist of the entire embryo or, if desired, certain parts thereof including the chorio-allantoic membrane, allantoic fluid or the yolk sac. These are matters which can be readily determined by those skilled in the art with very little experimentation by following the teachings herein contained.

To prepare a live virus vaccine from the embryonic tissue, it is harvested in the manner described above and then ground into a suspension with isotonic saline, Ringer's solution or some other conventional suspending agent. If desired, the material may be centrifuged to remove gross tissue. Since the preferred route of the inoculation is by oral ingestion, the vaccine may consist of nothing more than the ground embryonic tissue which may be administered directly or preferably in milk, chocolate or some other food. About 1 ml. to 5 ml. of the 20% to 50% ground embryonic tissue will normally constitute one immunizing dose of the live virus vaccine.

In preparing vaccines in accordance with the present invention, standards of sterility, potency, and identity as determined by the National Institutes of Health will, of course, be followed before the product is released for sale and use.

We claim:

1. An oral vaccine for the stimulation of antibody production in humans against poliomyelitis virus of the Lansing type, which comprises live poliomyelitis virus of the MEF-1 strain of the Lansing type modified and attenuated by at least 119 serial passages through suckling rodents, each successive passage differentially selecting for propagation avirulent virus particles as compared to virulent, until modification results in ability to grow in chick embryos followed by serial passage through chick embryos of 1 to 12 days of age for at least ten serial passages, said serial passages being continued until on test by oral ingestion in primates the virus is avirulent and on oral ingestion by human beings transforms a majority of Lansing type sero-negatives to sero-positives.

2. A process of producing an attenuated live virus vaccine for Lansing type poliomyelitis virus which is avirulent to human beings and on oral vaccination transforms a majority of vaccinated persons who are Lansing type sero-negative into sero-positives, which comprises inoculating virulent MEF-1 strain of Lansing type poliomyelitis virus into the central nervous tissue of suckling rodents, sacrificing the rodents after first appearance of paralytic symptoms and recovering the virus from the nervous tissue and inoculating other suckling rodents therewith, continuing the procedure for at least 119 serial passages until the virus is modified so as to propagate in incubating chick embryos, thereafter inoculating living chick embryos from 1 to 12 days of age with said modified virus, incubating from 2 to 10 days, recovering the virus therefrom and repeating the serial passages for at least ten times and until the virus on oral ingestion is avirulent to human beings and on oral ingestion transforms a majority of Lansing type sero-negatives into sero-positives.

3. A process according to claim 2 in which the suckling rodents are suckling hamsters.

4. A process according to claim 3 in which the virus modified by serial passage through the suckling hamster central nervous tissue has an $LD_{50}$ mouse titer of at least $10^{-5}$.

References Cited in the file of this patent

Medical Bulletin of the University of Minnesota, December 1957, pages 134–136.

Rivers et al.: Viral and Rickettsial Infections, 3rd edition, 1959, pub. by J. B. Lippincott Co., page 43.

Burgey's Manual of Determinative Bacteriology, 6th edition, 1948, pages 1257 and 1258.